Patented Feb. 1, 1927.

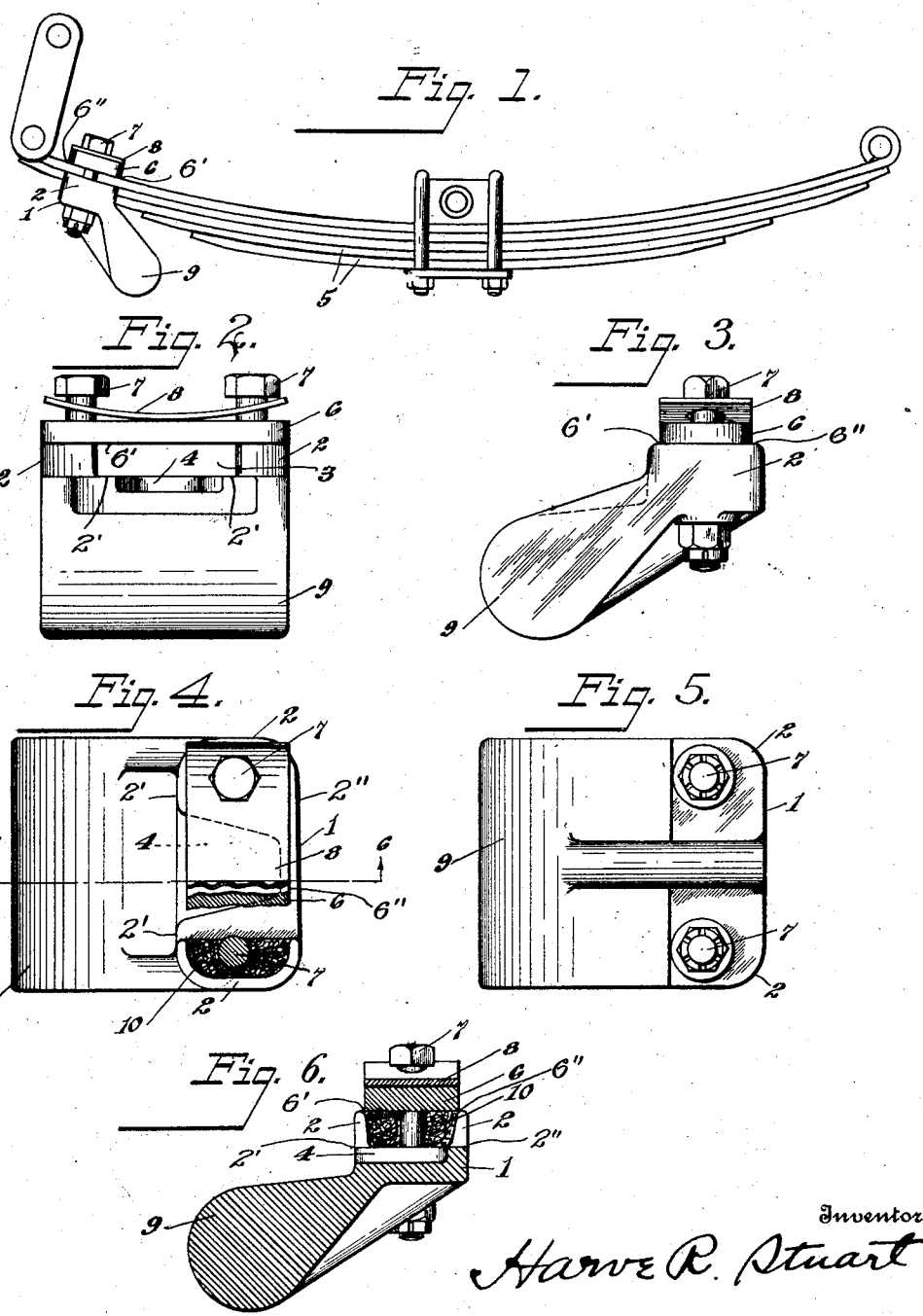

1,615,854

UNITED STATES PATENT OFFICE.

HARVE R. STUART, OF SPRINGFIELD, OHIO, ASSIGNOR TO THE BAUER-STUART COMPANY, OF SPRINGFIELD, OHIO, A CORPORATION OF OHIO.

SHOCK ABSORBER.

Application filed September 20, 1922, Serial No. 589,338. Renewed August 2, 1926.

My invention relates to improvements in shock absorbers for motor vehicles of a kind which are applied to the springs of the vehicle.

An object of my invention is to provide a shock absorber which will act to apply friction to the leaves of a vehicle spring when said spring is subjected to the shocks of road travel.

An object of the invention is to devise an absorber of simple construction which may be easily installed, economical in manufacture and effective for dampening or absorbing the shocks and vibrations of road travel by the inertia of a weighted member.

A further object of the invention is to provide an absorber in the nature of a weight so applied that it will act by inertia to dampen or absorb the vibrations of the supporting springs.

A further object of the invention is to provide an absorber in the nature of a weight so applied to a member between the frame and axle as to act through inertia to apply friction to relatively movable parts of said member to check the shocks of road travel.

A further object of the invention is to provide an absorber in the nature of a weight so applied to the springs as to act by the inertia of the weight to apply friction between the leaves of the spring during relative movements of the frame and axle.

A further object of the invention is to devise an absorber which is free of counteracting springs.

In the acompanying drawings:

Fig. 1 is a side view of a leaf spring of ordinary construction showing the manner of applying my improved absorber thereto.

Fig. 2 is an end viw of the absorber.

Fig. 3 is a side view.

Fig. 4 is a top plan partly broken away.

Fig. 5 is a bottom plan.

Fig. 6 is a section on the line 6—6 of Fig. 4.

Referring to the drawings, 1 represents a head forming one member of a clamp. This head has integral upwardly-projecting side walls 2 to form a central longitudinally extending channel 3, the floor of which is preferably recessed as is indicated at 4. This channel receives at least two of the leaves 5 of the spring, which are clamped therein by the bar 6 and bolts 7, a flat bowed spring plate 8, perforated to receive the bolts, being inserted between the heads of the bolts and the bar so that the leaves of the springs will be resiliently clamped to permit of the necessary relative sliding movement when in action.

Integrally formed with the head and projecting downwardly therefrom in angular direction is a weight formed in the nature of an arm 9.

The side walls 2 are curved inwardly at their ends to form pockets to receive packing 10 which is kept saturated with lubricating oil and rests in contact with the sides of the spring leaves to keep the same lubricated.

In operation, one of the devices is clamped to each spring at a point in proximity to one of its pivotal points, with the clamping members embracing at least two of the leaves of the spring. The device is so applied that the weight and its arm extend toward the axle in the direction of the length of the spring. The effect produced is to absorb and dampen the road vibrations between the axle and frame and to break up violent recoil of the springs as the vibration is transmitted to the body of the car, the road vibrations between the frame and axle being absorbed by the inertia of the weight and also by the fact that the relative change of position of the weight and spring due to the inertia of the weight causes friction to be applied to the leaves of the spring at the point where the absorber is attached. When the vehicle wheel strikes an obstruction and is thereby forced suddenly upward, the motion is imparted to each spring which carries it along its length in the form of a wave. When the weight is struck by this advancing wave, the inertia of the weight prevents it from following the motion of the spring and an increasing pressure is produced between the spring leaves which has the effect of stiffening the spring while the pressure lasts. This stiffening may be produced by a wave in either direction of the length of the spring so that the frame is prevented from being thrown upwardly suddenly or dropped suddenly.

A more specific explanation of the action which takes place is as follows: The rear edges 2' and the front edge 2'' of the head 1, as well as the rear and forward edges 6' and 6'' of the bar 6, constitute gripping points for the leaves of the spring, the edges 2' and 6'' constituting one pair of co-acting gripping points and the edges 6′ and 2″ another pair of co-acting gripping points. The gripping points of each pair are located in different parallel planes passing transversely through the spring, or, in other words, at different points in the length of the spring. As the body and axle of the vehicle approach each other or recede under the shock of road travel, the springs undergo a deformation. For instance, as the body recedes from the axle, or rebounds as it is generally called, the tendency is for the ends of the spring to move upwardly and thereby increase the curvature or bend in the leaves of the spring. The spring would thereupon act as a lever against the gripping point 6″ to swing the device about the gripping points 2′ as a fulcrum. Now, it will be seen that if such movement of the device can be prevented the result will be to apply an increased gripping effect upon the leaves of the spring by the co-action of the gripping points 2′ and 6″ and thereby overcome its tendency to deform or bend, and apply increased interleaf friction. In the present embodiment of my invention the weight 9 acting by inertia serves to hold the gripping points from following the deformation or curvature of the spring and thereby causes this increased gripping action upon the leaves of the spring. The same thing happens upon down-thrust of the spring excepting the spring acts as a lever against the gripping point 2″ to swing the device about the point 6′ as a fulcrum.

Other means, however, may be employed to prevent the gripping points from following the deformation or curvature of the spring upon rebound of the body, or upon the body and axle approaching each other, and I do not desire therefore to be limited to the exact means shown and described, i. e., the weight, as my invention contemplates any means which will act to prevent the gripping points from following what has been termed in the preceding paragraph as the advancing waves of the spring, or what has been called in the present paragraph as the deformation or increased curvature or bend in the spring.

Having thus described my invention, I claim:

1. In a device of the character described, the combination, with a carrying spring located between the axle and frame and having a plurality of leaves, of a weight clamped to at least two of said leaves and so connected therewith as to permit said leaves to have some movement relatively thereto whereby the weight will act by inertia under the shocks of road travel to apply friction between those leaves of the spring embraced thereby.

2. In a device of the character described, the combination, with a carrying spring located between the axle and frame and having a plurality of leaves, of a projecting weight clamped to at least two of said leaves and acting by inertia to dampen the vibrations imparted to said spring leaves by shocks of road travel.

3. In a device of the character described, the combination, with a carrying spring for supporting the frame from the axle, of a weight projecting in the direction of the length of said spring and toward the axle, together with means for clamping the weight to the spring, said weight acting by inertia to dampen the vibrations imparted to said spring by shocks of road travel.

4. In a device of the character described, the combination, with a carrying spring for supporting the frame from the axle, of a projecting weight, means for clamping said weight to at least two of the leaves of said spring, said clamping means being of a resilient character to permit some yielding movement of the parts, whereby said weight will act by inertia to cause the clamping means to exert friction between the leaves of said spring.

5. In a device of the character described, the combination, with a carrying spring located between the axle and frame, of a weighted arm secured to said spring and projecting in the direction of the length thereof and acting by inertia to dampen the vibrations imparted to said spring by shocks of road travel.

6. In a device of the character described, the combination, of a carrying spring located between the axle and frame, of a weighted arm resiliently clamped to at least two of the leaves of said spring and projecting in the direction of the length of said spring whereby the weighted arm will act by inertia under the shocks of road travel to apply friction between the leaves of the spring clamped thereby.

7. In a device of the character described, the combination, with a leaved vehicle spring, of a member resiliently clamped to a plurality of the leaves of said spring in comparatively close proximity to its pivotal point, and a weight projecting from said member having its center of gravity located on the side of said member opposite to said pivotal point.

8. In a device of the character described, the combination, with a vehicle spring, of a weighted member, a clamping member for resiliently clamping said weighted member to said spring, and means in addition to the clamping member for preventing said weight from creeping on said spring.

9. A stabilizer of the cantilever principle, comprising an arm carrying at one end a weight, and a clamp for fastening the other end of the arm to a vehicle spring.

10. A stabilizer of the cantilever principle, comprising an arm carrying at one end a weight, a clamp for fastening the other end of the arm to a vehicle spring, and the arm adjacent the clamp bent at an angle, whereby the arm meets the spring at an acute angle and the weight is positioned below the spring.

11. A stabilizer of the cantilever principle, comprising a weighted arm provided with a clamp for clamping the same to a vehicle spring, said stabilizer clamped on the spring leaves adjacent their connection with the vehicle body ends, and said arm bent downwardly adjacent the clamp, whereby the arm and the spring leaves meet at an acute angle.

12. In a shock absorber for motor vehicles, a device secured wholly to a plurality of leaves of a vehicle spring, said device being provided with gripping points on two opposite surfaces of said spring whereby change in the contour of the spring under road shocks tends to spread the gripping surfaces apart, said gripping surfaces being in different parallel planes passing transversely through said vehicle spring, and means acting to prevent the gripping points from so spreading to thereby cause said points to exert a greater gripping effect upon the leaves of the spring.

13. In a shock absorber for motor vehicles, a device secured wholly to a plurality of leaves of a vehicle spring, said device being provided with gripping points on each of two opposite surfaces of said spring located in different parallel planes passing transversely through said spring, changes in the contour of the spring under road shock tending to swing one of said points to a plane parallel with but closer to the other gripping point, and means for resisting such swinging movement to thereby cause said gripping points to exert a greater gripping effect upon the leaves of the spring.

14. In a shock absorber for motor vehicles, a device secured wholly to a plurality of leaves of a vehicle spring with gripping points on each of the two opposite surfaces of the spring located in different parallel planes passing transversely through said spring, changes in contour of said spring under road shock tending to swing one of said contact points in the arc of a circle with the other point as a fulcrum, and means for resisting said swinging movement to thereby cause said gripping points to exert an increased gripping action upon the leaves of said spring.

15. In a shock absorber for motor vehicles, a device secured wholly to a plurality of leaves of a vehicle spring, provided with gripping points arranged to grip opposite surfaces of said spring and means to prevent said gripping points from following the changing contour of the spring due to road shock whereby the deformation of that portion of the spring embraced by said gripping points causes said gripping points to exert an increased gripping action upon the leaves of the springs.

16. In a shock absorber for motor vehicles, a device secured to a plurality of leaves of a vehicle spring provided with gripping points arranged to grip opposite surfaces of said spring, and means for causing said gripping points to automatically exert increased gripping action upon the leaves of said spring upon rebound movement of said spring.

17. In a shock absorber for motor vehicles, a device secured to a plurality of leaves of a vehicle spring provided with cooperating gripping points arranged to grip opposite surfaces of said spring, and means for causing said gripping points to automatically exert increased gripping action upon the leaves of said spring on both up and down movement of said spring.

18. In a shock absorber for motor vehicles, a device secured to a plurality of leaves of a vehicle spring provided with cooperating gripping points arranged to grip opposite surfaces of said spring at different places in the length thereof, and means co-acting with said gripping points to cause the same to exert increased gripping action upon the leaves of said spring when said spring is deformed by shocks of road travel.

19. In a shock absorber for motor vehicles, a device secured wholly to a plurality of leaves of a vehicle spring said device being provided with gripping points on two opposite surfaces of said spring, whereby change in the contour of the spring under road shocks tends to spread the gripping surfaces apart, said gripping surfaces being in different parallel planes passing transversely through said vehicle spring, and a weight acting by inertia to prevent the gripping points from so spreading to thereby cause said points to exert a greater gripping effect upon the leaves of the spring.

20. In a shock absorber for motor vehicles, a device secured wholly to a plurality of leaves of a vehicle spring, said device being provided with gripping points on each of two opposite surfaces of said spring located in different parallel planes passing transversely through said spring, changes in the contour of the spring under road shock tending to swing one of said points to a plane parallel with but closer to the other gripping point, and a weight acting by inertia for resisting such swinging movement to thereby cause said gripping points to exert a greater gripping effect upon the leaves of the spring.

21. In a shock absorber for motor vehicles, a device secured wholly to a plurality of leaves of a vehicle spring with gripping points on each of the two opposite surfaces of the spring located in different parallel planes passing transversely through said spring, changes in contour of said spring under road shock tending to swing one of said contact points in the arc of a circle with the other point as a fulcrum, and a weight acting by inertia for resisting said swinging movement to thereby cause said gripping points to exert an increased gripping action upon the leaves of said spring.

22. In a shock absorber for motor vehicles, a device secured wholly to a plurality of leaves of a vehicle spring, provided with gripping points arranged to grip opposite surfaces of said spring and a weight acting by inertia to prevent said gripping points from following the changing contour of the spring due to road shock whereby the deformation of that portion of the spring embraced by said gripping points causes said gripping points to exert an increased gripping action upon the leaves of the springs.

23. In a shock absorber for motor vehicles, a device secured to a plurality of leaves of a vehicle spring provided with gripping points arranged to grip opposite surfaces of said spring, and a weight acting by inertia for causing said gripping points to automatically exert increased gripping action upon the leaves of said spring upon rebound movement of said spring.

24. In a shock absorber for motor vehicles, a device secured to a plurality of leaves of a vehicle spring provided with cooperating gripping points arranged to grip opposite surfaces of said spring, and a weight acting by inertia for causing said gripping points to automatically exert increased gripping action upon the leaves of said spring on both up and down movement of said spring.

25. In a shock absorber for motor vehicles, a device secured to a plurality of leaves of a vehicle spring provided with cooperating gripping points arranged to grip opposite surfaces of said spring at different places in the length thereof, and a weight acting by inertia and co-acting with said gripping points to cause the same to exert increased gripping action upon the leaves of said spring when said spring is deformed by shocks of road travel.

In testimony whereof, I have hereunto set my hand this 15th day of September, 1922.

HARVE R. STUART.